(12) United States Patent
Beneker et al.

(10) Patent No.: US 7,677,664 B2
(45) Date of Patent: Mar. 16, 2010

(54) MOTOR VEHICLE SEAT WITH PORTIONS MADE FROM COMPOSITE SHEET

(75) Inventors: Wilfried Beneker, Leichlingen (DE); Stefan Lingau, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 11/713,337

(22) Filed: Mar. 2, 2007

(65) Prior Publication Data
US 2007/0210636 A1    Sep. 13, 2007

(30) Foreign Application Priority Data
Mar. 2, 2006    (DE)    ............ 10 2006 010 288

(51) Int. Cl.
*B60N 2/07*    (2006.01)
(52) U.S. Cl. .............. 297/344.11; 297/344.2
(58) Field of Classification Search ............ 297/344.11, 297/344.17, 344.2
See application file for complete search history.

(56) References Cited

U.S. PATENT DOCUMENTS

| | | | | |
|---|---|---|---|---|
| 3,087,568 A * | 4/1963 | Kurtze | ............ | 181/290 |
| 5,048,886 A * | 9/1991 | Ito et al. | ............ | 296/65.14 |
| 5,375,552 A * | 12/1994 | Scott | ............ | 114/363 |
| 5,927,679 A * | 7/1999 | Hill | ............ | 248/588 |
| 6,789,844 B1 * | 9/2004 | Dennis | ............ | 297/216.1 |
| 6,854,805 B2 * | 2/2005 | Fujita et al. | ............ | 297/452.56 |
| 6,964,451 B1 * | 11/2005 | Bergey | ............ | 297/216.1 |
| 7,051,986 B1 * | 5/2006 | Taubmann et al. | ............ | 248/429 |
| 2001/0048058 A1 * | 12/2001 | Folliot et al. | ............ | 248/429 |
| 2004/0094683 A1 * | 5/2004 | Garrido et al. | ............ | 248/424 |
| 2004/0160113 A1 * | 8/2004 | Rehfuss et al. | ............ | 297/452.52 |

* cited by examiner

*Primary Examiner*—Joseph F Edell
(74) *Attorney, Agent, or Firm*—McCarter & English, LLP

(57) ABSTRACT

The invention relates to a motor vehicle seat with an underframe, two side parts and one seat back that is connected to the side parts by a seat back hinge mounting. At least portions of the motor vehicle seat are made from a composite sheet.

16 Claims, 3 Drawing Sheets

MOTOR VEHICLE SEAT WITH PORTIONS MADE FROM COMPOSITE SHEET

CROSS-REFERENCE TO RELATED APPLICATIONS

This application claims priority to German Application No. DE 10 2006 010 288.6, filed Mar. 2, 2006, the contents of which are expressly incorporated by reference in their entirety as part of the present disclosure.

The present invention relates to a motor vehicle seat with an underframe, two side parts and one seat back, which is connected to the side parts through a seat back hinge mounting. Such type motor vehicle seats are generally known and are used in a variety of ways.

Motor vehicle seats nowadays in particular have a great number of adjusting devices for adjusting and holding the motor vehicle seat in different positions. If the adjusting device serves for example to adjust the seat pan in height, it is responsible for the height of the seat pan with respect to a floor surface of the vehicle. In this case, the adjusting device retains for example two adjusting arms in the angular position set by the user. If the adjusting device serves for length adjustment, the mere seat pan or the entire seat may be shifted in the longitudinal direction of the vehicle. Adjustment devices for adjusting the incline of the seat back of the vehicle or for adjusting the head rest are also utilized.

The adjustment thereby usually occurs via a driven pinion that engages with a toothed rack, a toothed quadrant or a toothed wheel. The pinion may be driven manually, that is by hand, or with an electric motor. The electric motor runs at about 3000 rpm. Accordingly, a strong gear reduction is needed for achieving a precise and slow adjustment, this being the reason why a gear is usually interposed between the electric motor and the transmission unit, which transmits the rotation onto the vehicle seat. A drive shaft projecting from the gear has the pinion at its free end, the pinion engaging into a toothed rack of the vehicle seat in order to displace it in the longitudinal direction.

A disadvantage is that adjusting devices often make noises during adjustment and also because of their mass and fixation at the seat frame. These noises occur especially with electric motors and are a nuisance. Electric motors make inherent noises that can be minimized by muffling or insulating the housing accordingly. Other noises occur though, which are generated by the transmission of structure borne noise through the construction carrying the electric motor. Due to the movement of the electric motor, this carrying construction also starts to vibrate, thus generating noises. Similar noises may also be generated by vibrations irrespective of the electric motor, for example by vibrations transmitted from the engine of the vehicle to the frame of the vehicle seat.

SUMMARY OF THE INVENTION

It is the object of the present invention to provide a motor vehicle seat that produces no or only very little inherent noise. The important point is that the motor vehicle seat does not generate noises when subjected to vibrations or movements. Also, no additional noises should be generated when adjusting devices, electric motors in particular, are actuated.

With this object in view, the present invention provides a motor vehicle seat in which at least portions of the motor vehicle seat are made from a compound sheet metal.

As used herein, the term composite sheet is understood to refer to a material in which a soft layer such as a viscoelastic plastic material is interposed between two rigid layers. When the composite sheet is subjected to bending vibrations, the rigid materials, which are referred to as cover sheets herein after, slightly glide on each other, this causing periodic shear deformations in the soft or plastic core layer. Such a composite sheet is known under the name Bondal® for example.

By virtue of the inner friction of the viscoelastic plastic material, vibration energy is converted into heat, this significantly damping the vibration of the composite sheet. Accordingly, sound damping occurs by converting vibration energy into heat by inner friction so that the structure borne noise is dampened.

Alternatively, it is also possible to use composite sheets for muffling the sound source, such as an electric motor, so that the sound waves are reflected and not delivered to the outside world. Then, the muffling is part of the seat frame.

In principle, it is also possible, in the sense of the invention, to make the entire motor vehicle seat from composite sheets. The safety requirements placed on the motor vehicle seats must hereby be met, though. This may be achieved by composite sheets of appropriate thickness for example. Either the cover sheets may be implemented with sufficient thickness or there may be provided a plurality of layers of rigid material and of soft or viscoelastic materials.

Another advantageous possibility is to only make those component parts from composite sheet that are directly connected to sound sources. It is opportune to secure the electric motors provided for adjusting seat components or the entire seat to components made from composite metal. As a result, the structure borne noise of electric motors is significantly dampened.

An electric motor provided for the length adjustment of the motor vehicle seat is usually secured to a bridge for example, the bridge extending from one side part of the underframe to the other side part thereof. This bridge may be made from a composite sheet in accordance with the invention so that the noises generated by the electric motor are dampened.

Advantageously, the component part carrying the noise emitting source is secured to other component parts in such a manner that the viscoelastic layer will not be destroyed. It is opportune that, when two cover sheets are provided, one or both are welded to another component that is not made from composite sheet.

As a result, it is avoided that sound is transmitted from one cover sheet to the other by bridging the viscoelastic layer. This would, for example be the case if metallic screws were to extend through the entire composite sheet.

In accordance with the invention, it is also possible to use screws or rivets; in this case however, they need to be shielded from the rigid materials or cover sheets by a viscoelastic layer. Such fastening means must for example be sheathed by an appropriate material so that the screw itself will not contact the cover sheets.

Manufacturing the relevant components from composite sheet, there is further provided, in accordance with the invention, that the viscoelastic layer, which may be formed by an adhesive, is not yet cured when forming the component parts. As a result, it is achieved that the viscoelastic layer will not rupture for example during forming. The viscoelastic layers cure at a later stage, for example only upon completion of the motor vehicle seat. Curing may for example occur, in accordance with the invention, when the vehicle holding the motor vehicle seat is being painted, which is when increased temperatures prevail anyway during drying.

BRIEF DESCRIPTION OF THE DRAWINGS

Other features and advantages will become more apparent upon reviewing the appended claims and the following non restrictive description of an embodiment of the invention, given by way of example only with reference to the drawing. In the drawing:

DETAILED DESCRIPTION OF THE INVENTION

Herein after, the invention will be better understood upon reading the description of an exemplary embodiment. This exemplary embodiment is not intended to be limiting; all the component parts contacting the noise emitting apparatus or component parts may be made from composite sheet instead.

Figure 1:
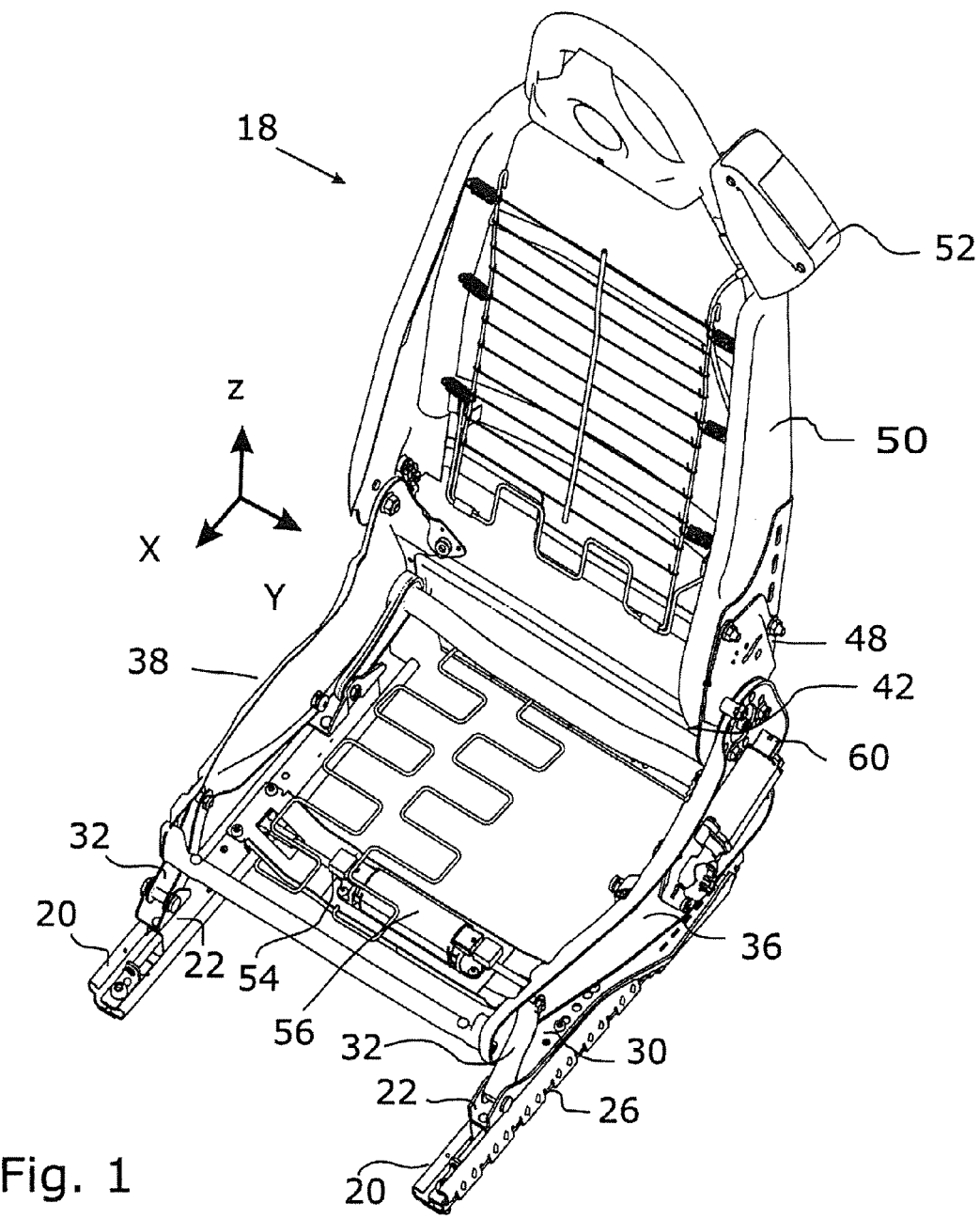
FIG. 1: is a perspective illustration of a motor vehicle seat viewed obliquely from the top and the side in which only the most important mechanical parts are shown.

FIG. 1 shows a motor vehicle seat 18 with a longitudinal adjustment having two pairs of rails, each comprising a bottom rail 20 and a seat rail 22. The bottom rails 20 are each secured to an underbody (not shown) of a motor vehicle that has not been illustrated in closer detail herein. The rails 20, 22 of either side are built identically. On the left seat side, which is subjected to heavier load, additional reinforcement profiles 26 are secured to the two rails 20, 22. They engage with a clearance therebetween and are not noticeable in normal operation, mutual engagement only occurring in the event of loads occasioned by an accident. Alternatively, the rails 20, 22 may also be reinforced by additional sheets.

As used herein, the front is understood to be in the positive x direction, meaning in the viewing direction of a user of the motor vehicle seat 20. Also, the left is in the positive y direction, the right in the negative y direction. The top is understood to refer to the positive z direction. The outboard side of the seat usually is the door side, at any rate in the case of two-seat vehicles in which the motor vehicle seat is a front seat.

Above the longitudinal guide there is an underframe that is carried by the longitudinal guide. On the left seat side, it has a console 30, on the right seat side, two bearing blocks performing the relevant function. On these, upward extending front pivotal supports 32 and rear pivotal supports (not visible) are carried and hinged. At the top, the pivotal supports are hinge-linked to a respective one of the side parts 36, 38. Between the left side part 36 and the right side part 38, there is a seat pan that has not been illustrated herein and that is pivotally hinged at the rear to the seat parts 36, 38. The two rear pivotal supports are joined into a substantially H-shaped unit by a rear tie bar 42.

The two side parts 36, 38 are made from one sheet metal piece. The left side part 36 exhibits significantly higher strength than the right side part 38. Preferably, the left side part is made from a metal sheet of more than 3 mm thick. The metal sheet thickness of the right side part 38 by contrast is about 2 mm. The left side part 36 can take at least 50%, preferably 100% higher forces than the right side part 38.

Viewed from the side, the side parts are substantially L-shaped, the shorter leg of the L projecting approximately upward in the z direction. In its upper portion, it carries a seat back mounting 48 about the pivot axis of which a seat back 50 is joined with the side parts 36, 38. An adjustable and lockable seat back hinge mounting 48 is thereby provided on the left seat side only. On the right seat side, only one passive pivot hinge is formed. The only one seat back hinge mounting 48 is configured so as to take all the crash forces that may act onto the seat back 50. It is essentially located underneath a seat belt deflector 52 fastened to the upper left corner of the seat back 50.

The seat back 50 has a stable U-shaped frame that is bent from a rigid tubular profile and is open toward the bottom. Further, the seat back 50 has two side cheeks that are attached to the outer side of the legs of this U profile and are joined transversely by an apron in the bottom region. These side cheeks also serve for fastening in the region of the seat back mounting 48 or of the passive hinge. By providing a seat back hinge mounting 48 on only one side, it is not necessary to provide a shaft for joining the two sides. In an alternative, the right seat side also has a seat back mounting 48 of its own, the seat back hinge mounting however being capable of only taking torques amounting to about one third of those taken by the seat back hinge mounting 48 of the left side. In this alternative, the two seat back hinge mountings of one shaft are joined together for synchronization.

The two rear pivotal supports are located between the side parts 36, 38. The front pivotal supports 32 are each hinge-linked to the open side of the side parts 36, 38, meaning on the left seat side in the exemplary embodiments.

The specification relates to the seat shown in all the Figs., the seat being a driver's seat for left-hand drive motor vehicles. The corresponding passenger front seat is configured in a mirror inverted fashion, the plane of symmetry lying in the center of the vehicle, in the x-z plane.

According to prior art, height adjustment also occurs through a toothed quadrant that is connected to the left rear pivotal support. It meshes with a pinion that is carried in the associated side part 36. The pinion is actuated through a drive apparatus, such as a clamp roller ratchet gear. This drive apparatus is located, at least partially, in the trough-shaped interior of the left seat part 36. The toothed quadrant is quite thick, e.g., of a material thickness of 5 mm, and is additionally reinforced by a toothed additional part of about 4 mm thick. High strength is thus achieved.

In the motor-driven alternative, the pinion is connected to an electric motor, which is also disposed at least partially in the trough-shaped interior of the left profile part 36. It only matters that in the manual and motor-driven alternative the toothed quadrant and the pinion, also the pinion bearing in the side part 36, remain the same. The height adjustment of the side parts 36, 38 occurs on only one side, on that seat side that is turned away from the buckle, meaning on the left seat side in the exemplary embodiment. Through the rear tie bar 42, which is configured to be accordingly strong, the adjustment is transmitted to the passive right seat side. As a result, savings in drive apparatus are made on the right seat side.

In the event of manual implementation, the seat back 50 is locked through the seat back hinge mounting 48. Again, the lock is only provided on the left seat side. In the motor-driven alternative, which also works on the left seat side only, there is provided another electric motor that is located in front of the left leg of the U profile and on the inner side of the left side cheek and extends upward. The drive occurs according to prior art.

The height adjustment of the front edge of the seat is performed relative to the side parts 36, 38. The advantage thereof is that the corresponding adjustment device needs not be designed for taking all the crash forces. The crash forces are introduced into the longitudinal guide through the pivotal supports 32, 34. The height adjustment of the seat front edge may thus be eliminated without having to change the construction of the side parts 36, 38 and of the pivotal supports 32, 34. As a result, the variants are very easy to realize.

On a bridge 54, there is provided another electric motor 56 for adjusting the vehicle seat in length in the x direction. The bridge 54 is secured to the seat rails 22.

Figure 2:
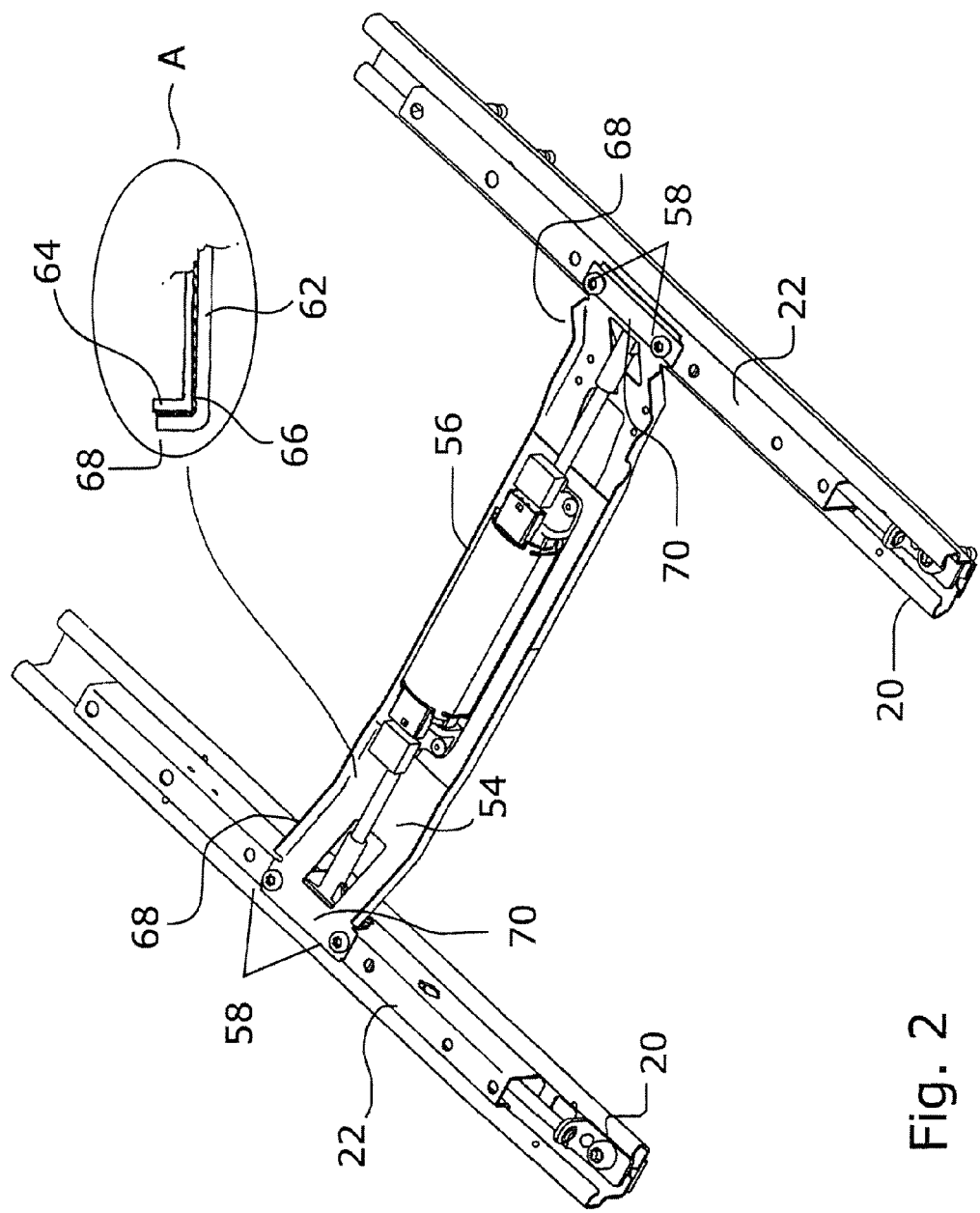
FIG. 2: shows a composite sheet bridge secured to two longitudinal guides of the motor vehicle seat and carrying an electric motor.

FIG. 2 clearly shows the fastening and the structure of the bridge 54. In the exemplary embodiment shown, the bridge is fastened to the seat rails 22 through the screws 58. The electric motor 56 is also screwed to the bridge 54. FIG. 2 further shows a detail A of the cross section of the bridge 54 in the x direction. It can be seen that the bridge 54 is made from a composite sheet with two cover sheets 62, 64 between which there is sandwiched a soft, preferably viscoelastic layer 66. For reasons of stability, the bridge 54 has a border area 68 that is angled about approximately 90°. Through the viscoelastic layer 66, the sound generated by the electric motor 56 and transmitted to the bridge 54 is dampened. The bridge 54 of the invention not only dampens the sound generated by the electric motor 56 but also any other sound transmitted thereto.

Figure 3:
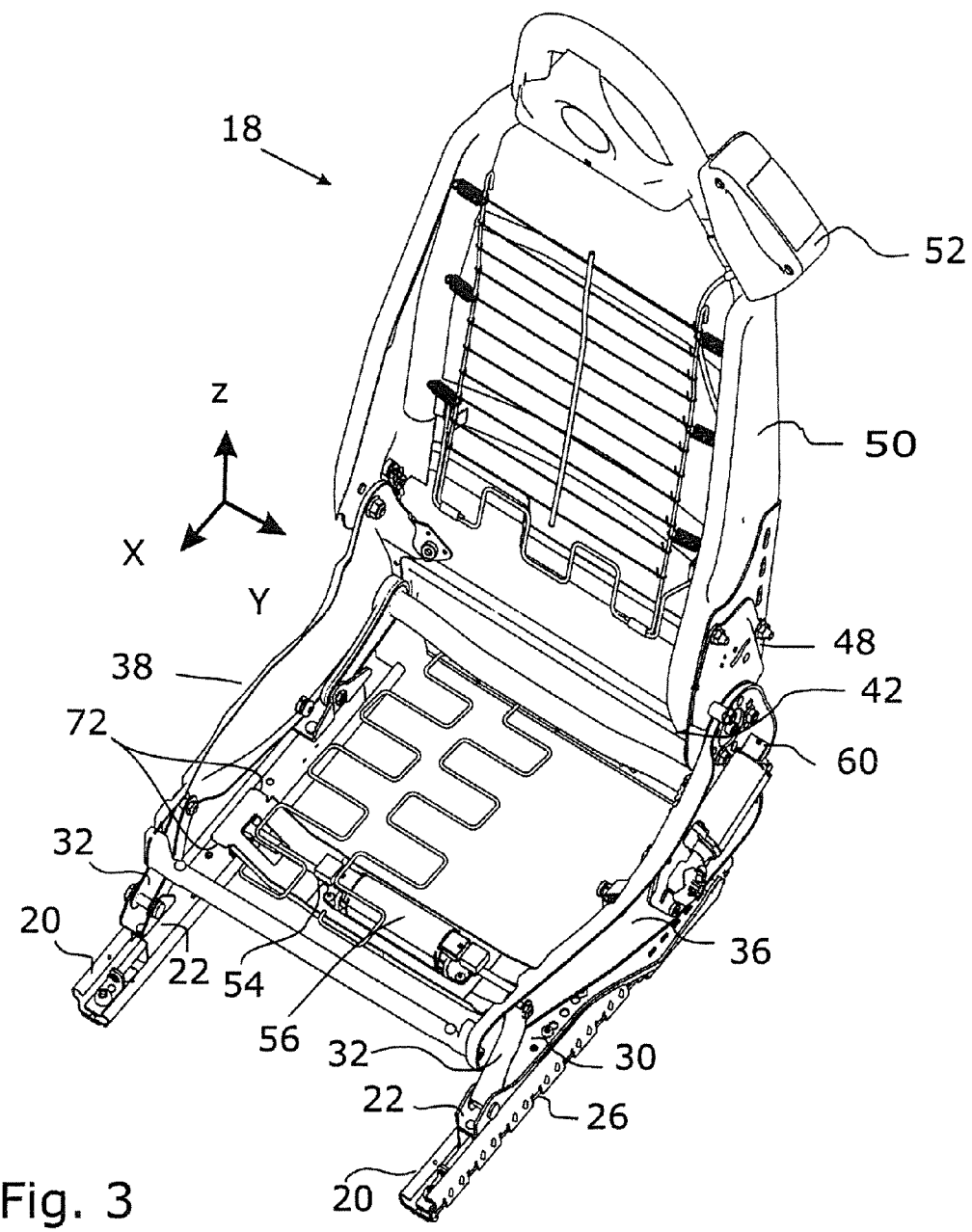
FIG. 3: is a perspective illustration of an alternative embodiment of the motor vehicle seat shown in FIG. 1 wherein the bridge is welded to the seat rails.

The bridge 54 further has two flat end regions 70 through which extend the screws 58 for fastening it to the seat rails 22. Advantageously, these end regions 68 are not made from composite material; instead, the viscoelastic layer 66 tapers off approximately where the border region 68 of the bridge 54 also ends in the y direction. Alternatively, it is also possible to shield the screws 58 from the cover sheets 62 and 64 respectively by a softer material. Furthermore, a welding bond 72 may be chosen instead of the screws 58, as shown in FIG. 3.

The invention is not limited to the exemplary embodiment described. The use of only one cover sheet 62 or 64 may also be envisaged, the cover sheet being then coated with a viscoelastic layer 66.

What is claimed is:

1. A motor vehicle seat comprising: an underframe; two side parts; a seat back hinge mounting; and one seat back that is connected to said two side parts by the seat back hinge mounting, said underframe comprising a bridge disposed between seat rails; an electric motor carried by the bridge; and a longitudinal adjusting device driven by the electric motor; wherein the bridge comprises composite sheet material comprising a first soft material portion interposed between two rigid layers and is connected to the seat rails in such a manner that sound transmission between the bridge and the seat rails connected thereto is dampened, and the bridge is connected to the seat rails through connecting means, the connecting means being sufficiently surrounded by a second soft material portion in such a manner that the connecting means does not directly contact the bridge and sound transmission is dampened between the bridge and the seat rails.

2. The motor vehicle seat as set forth in claim 1, wherein the portions in contact with the adjusting device are made from the composite sheet material.

3. The motor vehicle seat as set forth in claim 2, wherein the rigid layers are metallic.

4. The motor vehicle seat as set forth in claim 3, wherein at least one of the first and second soft material portions is viscoelastic.

5. The motor vehicle seat as set forth in claim 1, wherein the portions of the motor vehicle seat in contact with the electric motor are made from the composite sheet material.

6. The motor vehicle seat as set forth in claim 5, wherein the rigid layers are metallic.

7. The motor vehicle seat as set forth in claim 6, wherein at least one of the first and second soft material portions is viscoelastic.

8. The motor vehicle seat as set forth in claim 1, wherein the rigid layers are metallic.

9. The motor vehicle seat as set forth in claim 8, wherein at least one of the first and second soft material portions is viscoelastic.

10. The motor vehicle seat as set forth in claim 1, wherein the bridge is formed in a forming step, at least one of the first and second soft material portions comprises viscoelastic material that comprises a curable material, the curable material of the viscoelastic material is not yet cured when performing the forming step, and is cured at a later stage of completion of the motor vehicle seat.

11. The motor vehicle seat as set forth in claim 1, wherein the bridge has a border area that is angled.

12. The motor vehicle seat as set forth in claim 1, wherein the bridge further has two flat end regions for fastening the bridge to the seat rails, the end regions are not made from the composite sheet material.

13. The motor vehicle seat as set forth in claim 1, wherein portions of the motor vehicle seat in addition to the bridge are made from the composite sheet material.

14. The motor vehicle seat as set forth in claim 1, wherein at least one of the first and second soft material portions are viscoelastic.

15. The motor vehicle seat as set forth in claim 2, wherein at least one of the first and second soft material portions are viscoelastic.

16. The motor vehicle seat as set forth in claim 5, wherein at least one of the first and second soft material portions are viscoelastic.

* * * * *